(12) United States Patent
Tsuchiya et al.

(10) Patent No.: US 9,919,722 B2
(45) Date of Patent: Mar. 20, 2018

(54) RAILROAD VEHICLE

(71) Applicant: Hitachi Industrial Equipment Systems Co., Ltd., Chiyoda-ku, Tokyo (JP)

(72) Inventors: Kenji Tsuchiya, Tokyo (JP); Ayumu Morita, Tokyo (JP); Makoto Watanabe, Tokyo (JP); Yoshinori Shimada, Tokyo (JP); Hideo Kitabayashi, Tokyo (JP); Wataru Murata, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 210 days.

(21) Appl. No.: 14/768,593

(22) PCT Filed: Feb. 12, 2014

(86) PCT No.: PCT/JP2014/053180
§ 371 (c)(1),
(2) Date: Aug. 18, 2015

(87) PCT Pub. No.: WO2014/156348
PCT Pub. Date: Oct. 2, 2014

(65) Prior Publication Data
US 2016/0001798 A1    Jan. 7, 2016

(30) Foreign Application Priority Data

Mar. 28, 2013   (JP) .................................. 2013-068541

(51) Int. Cl.
*B61G 5/10*   (2006.01)
*B60L 5/18*   (2006.01)
(Continued)

(52) U.S. Cl.
CPC .................. *B61G 5/10* (2013.01); *B60L 5/18* (2013.01); *H01H 31/026* (2013.01); *H01H 71/24* (2013.01)

(58) Field of Classification Search
CPC .... B61G 5/10; B60L 3/04; B60L 5/18; H01H 31/02; H01H 31/026; H01H 71/24
(Continued)

(56) References Cited

U.S. PATENT DOCUMENTS

2012/0274428 A1* 11/2012 Reuber ............ H01H 33/66207
335/6
2014/0008169 A1*  1/2014 Kawasaki ................ B61G 5/10
191/59.1
(Continued)

FOREIGN PATENT DOCUMENTS

JP     5-260602 A    10/1993
JP     5-300602 A    11/1993
(Continued)

OTHER PUBLICATIONS

JP2009136142, dated Jun. 2009 (English translation).*
(Continued)

*Primary Examiner* — Mark T Le
(74) *Attorney, Agent, or Firm* — Crowell & Moring LLP

(57) ABSTRACT

A railroad vehicle includes a plurality of vehicle units, a cable, and a disconnector. In the plurality of vehicle units respective vehicles are coupled. The cable is placed astride the vehicles to connect the power supply unit of each vehicle unit. The disconnector is installed at some midpoint in the cable and electrically separates the vehicle units from one another.

17 Claims, 6 Drawing Sheets

(51) Int. Cl.
*H01H 31/02* (2006.01)
*H01H 71/24* (2006.01)

(58) Field of Classification Search
USPC .................................. 307/9.1; 335/6, 170
See application file for complete search history.

(56) References Cited

U.S. PATENT DOCUMENTS

2014/0020999 A1    1/2014   Kawasaki et al.
2014/0132373 A1*   5/2014   Takahashi .......... H01H 33/6662
                                                                335/170

FOREIGN PATENT DOCUMENTS

| JP | 2000-134717 A | 5/2000 |
| JP | 2004-236398 A | 8/2004 |
| JP | 2007-252022 A | 9/2007 |
| JP | 2009-136142 A | 6/2009 |
| WO | WO 2012/095895 A1 | 7/2012 |

OTHER PUBLICATIONS

Extended European Search Report issued in counterpart European Application No. 14773987.4 dated Oct. 27, 2016 (six (6) pages).
International Search Report (PCT/ISA/210) dated Apr. 22, 2014 with English-language translation (four (4) pages).
Japanese-language Office Action issued in counterpart Japanese Application No. 2013-068541 dated Jan. 31, 2017 with English translation (Seven (7) pages).

* cited by examiner

RAILROAD VEHICLE

TECHNICAL FIELD

The present invention relates to railroad vehicles and in particular to a railroad vehicle suitably applicable to those composed by coupling a plurality of vehicle units dispersedly mounted with main power devices composing power supply units.

BACKGROUND ART

Railroad vehicles composed by coupling a plurality of vehicles adopt a vehicle unit system. In the vehicle unit system, a plurality of vehicles composing one railroad vehicle are mounted with: a pantograph, a power supply unit configured of main power devices, such as a main transformer and a main converter, and an auxiliary power supply device, and auxiliary devices including an air compressor etc.

For example, the main power devices are dispersedly mounted on four vehicles and four vehicles are taken as one vehicle unit. A plurality of the vehicle units are coupled to compose a railroad vehicle.

When vehicle units are coupled to compose a railroad vehicle, the railroad vehicle is provided with the same number of pantographs as that of vehicle units. Pantographs are prone to become a source of noise and it is desirable to reduce the number of pantographs.

Consequently, a high-voltage cable is installed on the roofs of a railroad vehicle and power supply units are connected with one another through the high-voltage cable to reduce the number of pantographs. A shinkansen train composed of 10 vehicles will be taken as an example. When the train is provided with four power supply units, the four power supply units are connected with one another through a high-voltage cable; therefore, a pantograph only has to be provided in two places.

A high-voltage cable between vehicles in a vehicle unit is connected through a high-voltage joint and a high-voltage cable between vehicle units is connected through a high-voltage joint or a high-voltage insulator.

If a problem such as a ground fault occurs in a high-voltage cable, it is required to separate (electrically cut off) the high-voltage cable involving a point of problem and sound high-voltage cables from each other to prevent the ripple effect of the problem.

To electrically separate a high-voltage cable connecting the power supply units of vehicle units, conventionally, an operator must conduct the work described below. The operator climbs onto the roof of a vehicle and separates a connecting wire connecting one high-voltage insulator and the other high-voltage insulator using a tool. This separating work is high-elevation work and sufficient care must be paid to safety.

Patent Literature 1 proposes a technology with respect to railroad vehicles in which a plurality of power supply units are connected with one another through a high-voltage cable. According to the technology, a plurality of power supply units can be separated from each other without climbing onto the roof of a vehicle.

A more specific description will be given. Patent Literature 1 describes that: a high-voltage circuit breaker is configured of a vacuum circuit breaker that interrupts power supply to a power supply unit and a mechanical circuit breaker that is connected to the vacuum circuit breaker and cuts off a plurality of power supply units from one another; the high-voltage circuit breaker is placed in an equipment box; and the equipment box is so constructed that the equipment box can be opened and closed and is installed underfloor of a vehicle. After the equipment box installed under the floor is opened, a connecting wire connecting one high-voltage insulator and the other high-voltage insulator of the mechanical circuit breaker with each other is separated by an operator using a tool. Thus the operator need not climb onto the roof of a vehicle and only has to conduct underfloor work to separate a high-voltage cable involving a point of problem and sound high-voltage cables from each other.

CITATION LIST

Patent Literature

Patent Literature 1: Japanese Patent Application Laid-Open No. 2009-136142

SUMMARY OF INVENTION

Technical Problem

According to Patent Literature 1, an operator can separate a high-voltage cable involving a point of problem and sound high-voltage cables from each other only by underfloor work without climbing onto the roof of a vehicle. However, the work under the floor of a vehicle is conducted by an operator separating a connecting wire connecting one high-voltage insulator and the other high-voltage insulator of a mechanical circuit breaker using a tool. This poses a problem to be solved in terms of the improvement of workability.

The present invention has been made in consideration of the foregoing and it is an object of the present invention to provide a railroad vehicle. According to the railroad vehicle, it is possible not only to separate a high-voltage cable involving a point of problem and sound high-voltage cables from each other without an operator climbing onto the roof of a vehicle; but it is possible also to automatically conduct the separating work without necessity for any special work.

Solution to Problem

To achieve the object, a railroad vehicle of the present invention is formed by dispersedly mounting a plurality of vehicles with main power devices that are supplied with power from a power supply line through a pantograph and constitute a power supply unit. The railroad vehicle is provided with: a plurality of vehicle units in which the vehicles are coupled; a cable installed astride the vehicles to connect the power supply unit of each vehicle unit; and a disconnector that is installed at some midpoint in the cable and electrically separates the vehicle units from each other.

Specifically, the disconnector is installed at some midpoint in the cable installed on the roof of a vehicle flush with the roof of the vehicle. Alternatively, an equipment box through which the cable passed is installed under the floor of the vehicle and the disconnector is installed at some midpoint in the cable in the equipment box.

Advantageous Effects of Invention

According to the present invention, it is possible to obtain a railroad vehicle in which: it is possible not only to separate a high-voltage cable involving a point of problem and sound high-voltage cables from each other without an operator climbing onto the roof of a vehicle; but it is possible also to automatically conduct the separating work without necessity for any special work.

DESCRIPTION OF EMBODIMENTS

Figure 1:
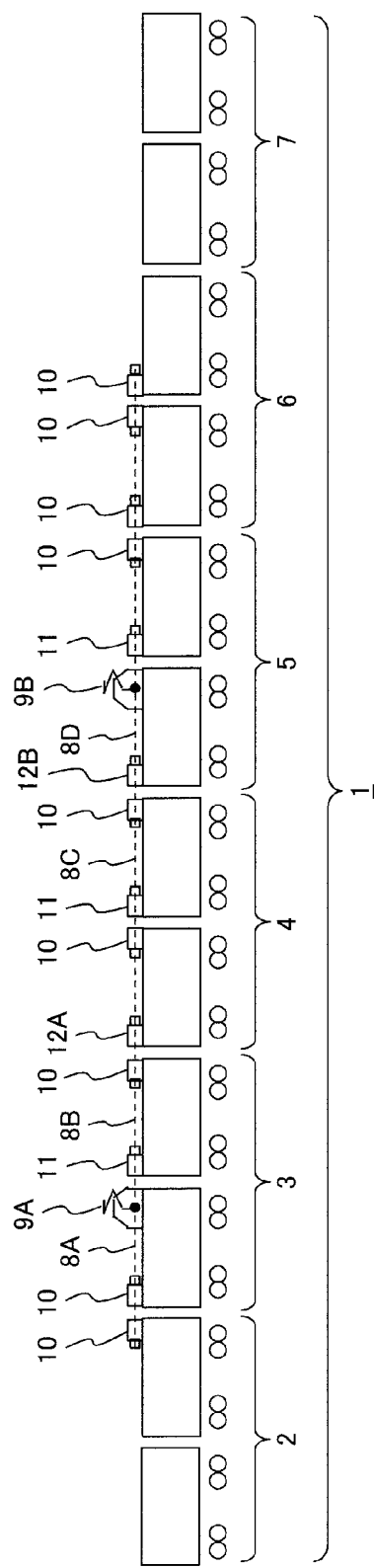
FIG. 1 is a drawing illustrating an example of vehicle composition of a railroad vehicle in a first embodiment of the present invention.

Hereafter, a description will be given to a railroad vehicle of the present invention based on illustrated embodiments. In the following description, the same parts will be marked with the same reference numerals and a repetitive description of such parts will be omitted.

First Embodiment

FIG. 1 illustrates an example of vehicle composition of a railroad vehicle in a first embodiment of the present invention.

As illustrated in the figure, the railroad vehicle 1 in this embodiment is composed of 12 vehicles. Two vehicles compose one vehicle unit and the railroad vehicle 1 is composed of a first vehicle unit 2, a second vehicle unit 3, a third vehicle unit 4, a fourth vehicle unit 5, a fifth vehicle unit 6, and a sixth vehicle unit 7.

Though not specially illustrated, each vehicle unit 2 to 7 is mounted with: a power supply unit configured of a main power device, such as a main transformer and a main converter, and an auxiliary power supply device; and auxiliary equipment, such as an air compressor.

The power supply unit mounted on each vehicle unit 2 to 7 is connected with high-voltage cables 8A, 8B, 8C, 8D connected through a high-voltage joint 10 and a trifurcated high-voltage cable head 11. The high-voltage cables 8A, 8B, 8C, 8D are supplied with power from a power supply line (not shown) through pantographs 9A and 9B installed on the roofs of vehicles. The power supply unit of each vehicle unit 2 to 7 is supplied with power from the high-voltage cables 8A, 8B, 8C, 8D.

The pantograph 9A is installed on the roof of the third vehicle in the second vehicle unit 3; and the pantograph 9B is installed on the roof of the seventh vehicle in the fourth vehicle unit 5. Since the high-voltage cables 8A, 8B, 8C, 8D are installed astride vehicles, the high-voltage cables 8A, 8B, 8C, 8D are flexible to permit changes such as curve passage, bending, and biased tracks.

In this embodiment, disconnectors 12A and 12B for electrically separating vehicle units are installed on the following places: the roof of the fifth vehicle in the third vehicle unit 4 at some midpoint in the high-voltage cable 8B and the high-voltage cable 8C; and the roof of the seventh vehicle in the fourth vehicle unit 5 at some midpoint in the high-voltage cable 8C and the high-voltage cable 8D. The disconnectors 12A and 12B are installed flush with the roofs of the vehicles.

A more specific description will be given. The disconnector 12A is installed on the roof of the fifth vehicle and the disconnector 12B is installed on the roof of the seventh vehicle. That is, cases (to be described later) respectively housing the disconnectors 12A and 12B are directly secured on the roofs of the vehicles using a securing means such as a bolt without use of an insulator or the like. The cases are so installed that the disconnectors 12A and 12B are opened and closed in the horizontal direction.

A description will be given to the state of installation of the disconnectors 12A and 12B with reference to FIG. 2 and FIG. 3.

Figure 2:
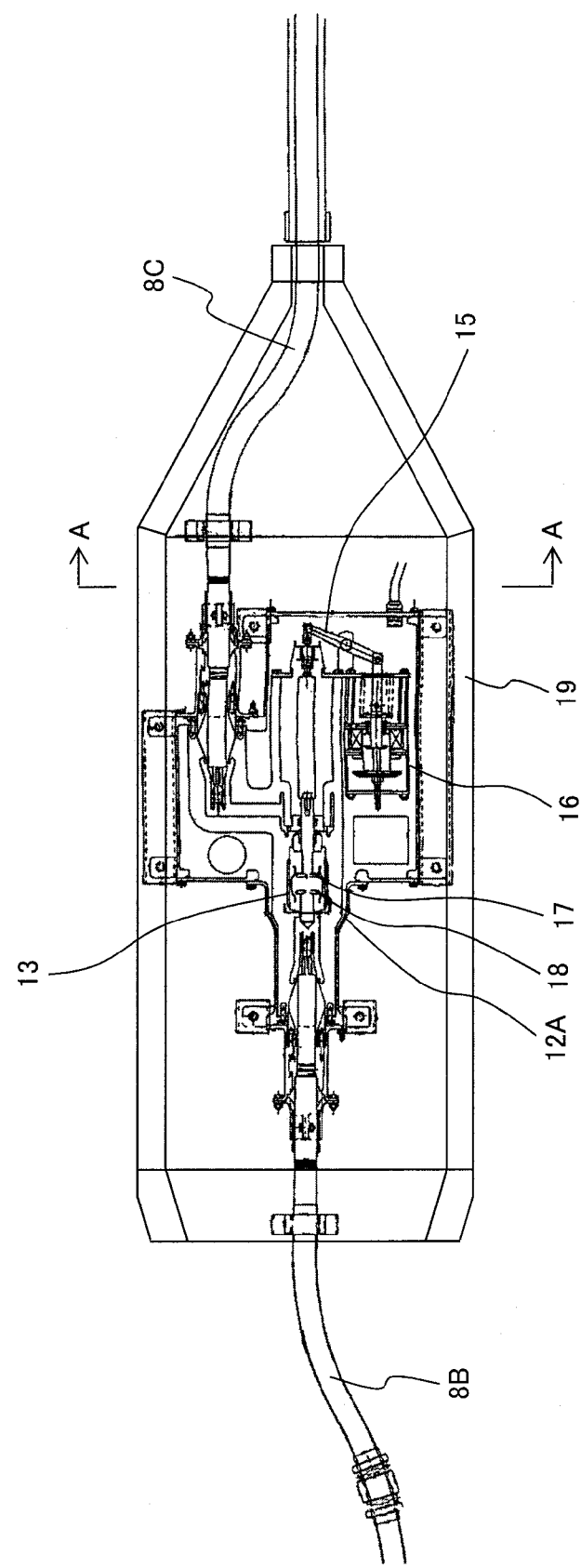
FIG. 2 is a sectional view showing a disconnector adopted in a railroad vehicle in the first embodiment of the present invention as is installed.
Figure 3:
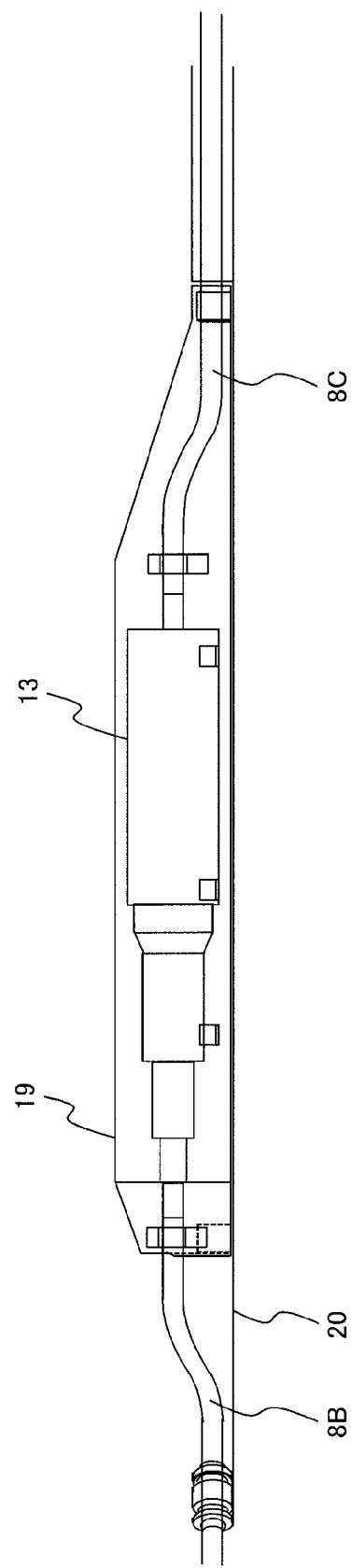
FIG. 3 is a side view of FIG. 2.

Since the disconnectors 12A and 12B are identical in configuration, the disconnector 12A will be taken as an example in the description of FIG. 2 and FIG. 3.

As illustrated in the figures, the disconnector 12A is formed of a vacuum circuit breaker 13, described in detail later. The fixed side of the vacuum circuit breaker 13 is connected to the high-voltage cable 8B and the movable side is connected to the high-voltage cable 8C. The movable side of the vacuum circuit breaker 13 is connected to an electromagnetic operating device 16 through a link mechanism 15. The movable electrode 17 of the vacuum circuit breaker 13 is actuated through operation with the electromagnetic operating device 16 and the operation of disconnecting from/connecting to the fixed electrode 18 (closing/opening operation) is carried out. (FIG. 2 shows the disconnector in the open state.)

Aside from the electromagnetic operating device 16, the vacuum circuit breaker 13 can also be operated with an air operating device using an air cylinder.

In this embodiment, the vacuum circuit breaker 13 and the electromagnetic operating device 16 are installed substantially in parallel to each other in the case 19 together with a part of the high-voltage cable 8C. By installing and securing the case 19 on the roof 20 of the vehicle, the vacuum circuit breaker 13 and the electromagnetic operating device 16 are secured on the roof 20 of the vehicle without use of an insulator or the like.

Figure 4:
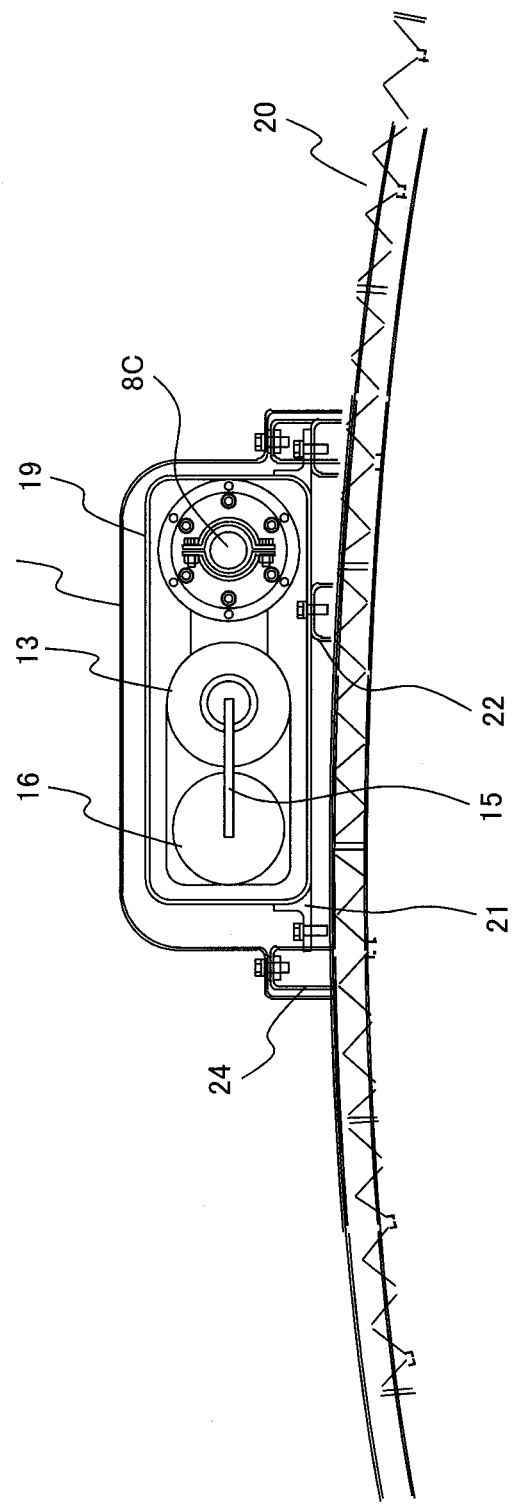
FIG. 4 is a sectional view taken along line A-A of FIG. 2.

FIG. 4 shows in detail the case 19 with the vacuum circuit breaker 13 and the electromagnetic operating device 16 housed in the case as is secured on the roof 20 of the vehicle.

As illustrated in the figure, the case 19 with the vacuum circuit breaker 13 and the electromagnetic operating device 16 housed in the case is supported by a support plate 21. The case is secured on the roof 20 of the vehicle by securing the support plate 21 on a first U-shaped hardware 22 directly embedded into the roof 20 of the vehicle with a bolt or the like.

The case 19 is surrounded with a protection cover 23 except the bottom face of the case. The protection cover 23 is also secured on a second U-shaped hardware 24, higher than the first U-shaped hardware 22 directly embedded into the roof 20 of the vehicle, with a bolt or the like.

This configuration makes it possible to secure the case 19 with the vacuum circuit breaker 13 and the electromagnetic operating device 16 housed in the case directly on the roof 20 of the vehicle.

Figure 5:
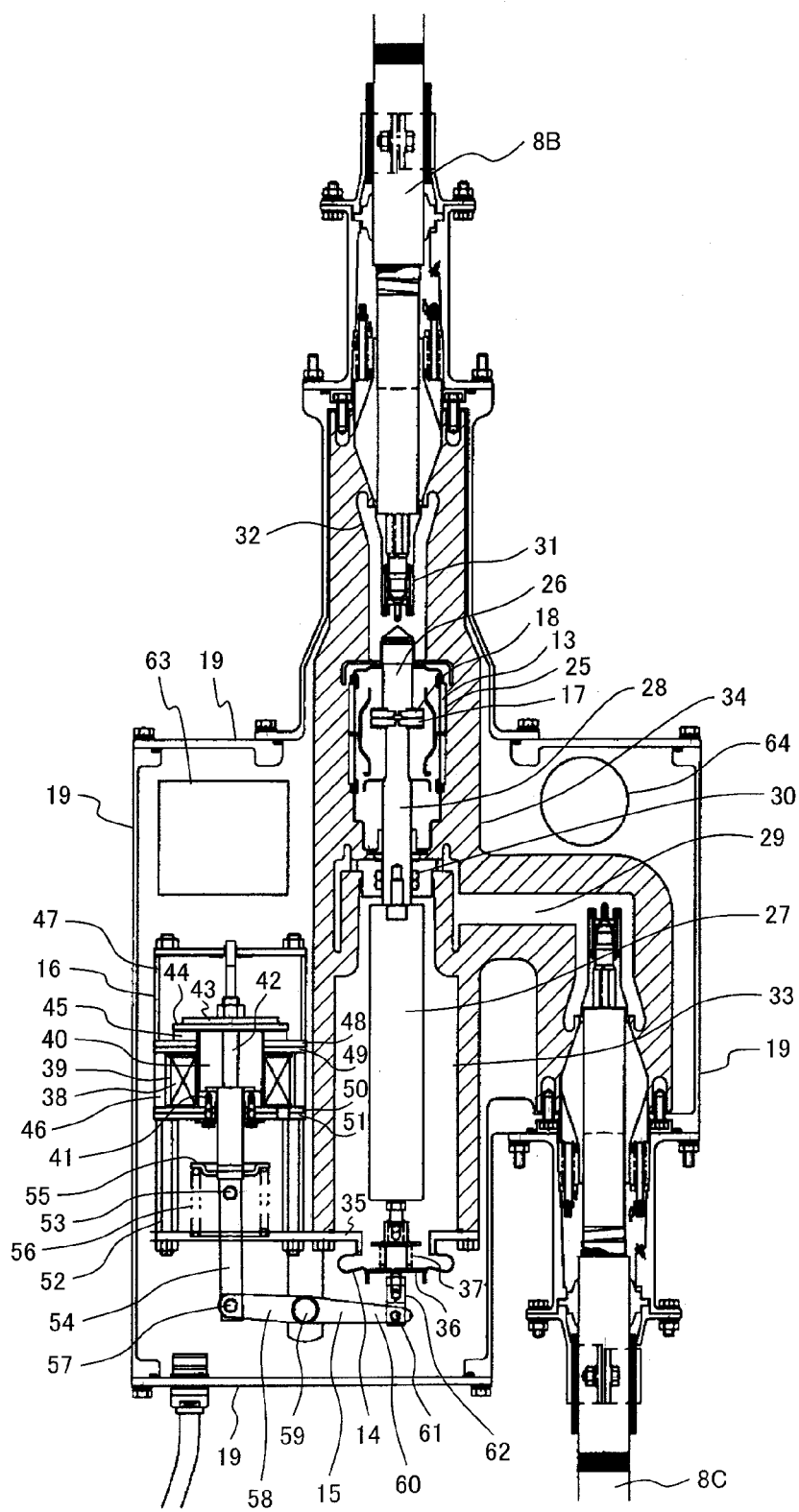
FIG. 5 is a sectional view showing a disconnector adopted in a railroad vehicle in the first embodiment of the present invention as is closed.
Figure 6:
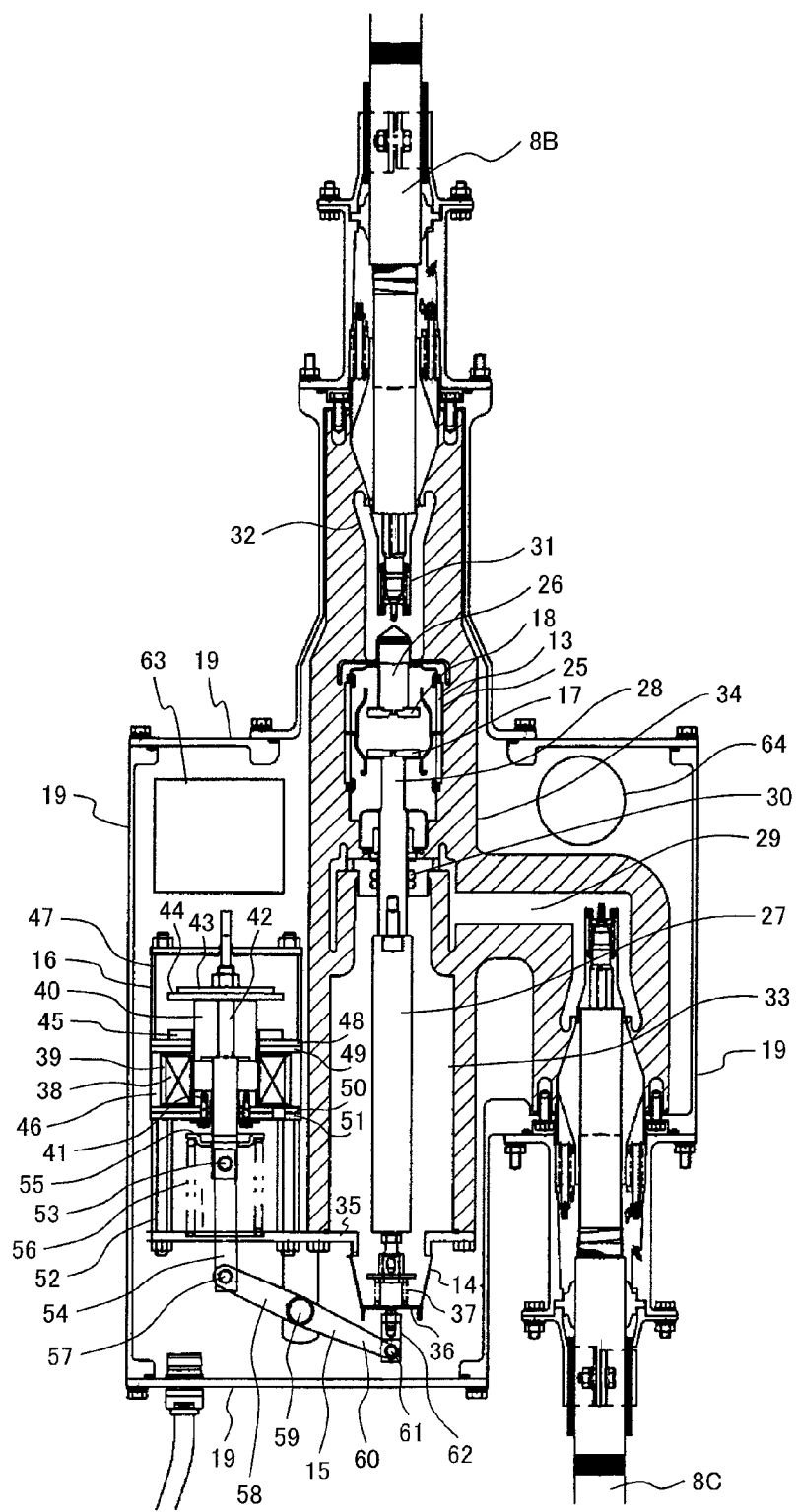
FIG. 6 is a sectional view showing a disconnector adopted in a railroad vehicle in the first embodiment of the present invention as is opened.

A detailed description will be given to the structures of the vacuum circuit breaker 13 and the electromagnetic operating device 16 with reference to FIG. 5 and FIG. 6. FIG. 5 shows the vacuum circuit breaker 13 as is closed and FIG. 6 shows the vacuum circuit breaker 13 as is opened.

As illustrated in the figures, the vacuum circuit breaker 13 is roughly composed of: a vacuum valve 25; a movable electrode 17 and a fixed electrode 18 opposed to each other in the vacuum valve 25; a fixed conductor 26 on one end of which the fixed electrode 18 is secured and to the other end of which the high-voltage cable 8B is connected; a movable conductor 28 on one end of which the movable electrode 17 is secured and on the other end of which the link mechanism 15 is secured through an insulating rod 27; and a connecting conductor 29 one end of which is connected to the movable conductor 28, the other end of which is connected with the high-voltage cable 8C, and which electrically connects the movable conductor and the high-voltage cable together.

A spring contact 30 functioning as a sliding contactor is placed in the contact portion between the connecting conductor 29 and the movable conductor 28. This allows contact with the movable conductor 28 by the electromagnetic operating device 16.

A current collector 31 is provided at the junction between the fixed conductor 26 and the high-voltage cable 8B. The current collector 31 is surrounded with a first cylindrical enclosure 32 and the insulating rod 27 connected with the movable conductor 28 is surrounded with a second cylindrical enclosure 33. Each of the first cylindrical enclosure 32, the vacuum valve 25, the second cylindrical enclosure 33, the connecting conductor 29, and a part of the high-voltage cable 8C is molded with an epoxy resin 34 and the surface of the epoxy resin 34 is conductively grounded.

A rubber bellows 14 that expands and contracts following the movement of the insulating rod 27 is supported by a base 35. One end of the base 35 is supported by a support plate 36 located below the insulating rod 27 and the other end is positioned below the second cylindrical enclosure 33. A wiping spring 37 is fit between the insulating rod 27 and the support plate 36 located below the insulating rod.

The electromagnetic operating device 16 is configured of: a coil 38, a coil bobbin 39, a movable core 40, a fixed core 41, a first drive rod 42, two movable flat plates 43, 44, a permanent magnet 45, cylindrically formed iron covers 46, 47, iron supporting plates 48, 49, 50, 51, a fixed rod 52, and the like.

The coil 38 is housed in the coil bobbin 39 placed between the supporting plate 49 and the supporting plate 50; and the fixed rod 52 is secured together with the base 35 on the bottom side of the case by using a bolt and a nut.

The first drive rod 42 is placed at the central part of the coil 38 along the vertical direction. The upper part of the first drive rod 42 is inserted into through holes (not shown) in the movable flat plates 43, 44; and the lower part is inserted into through holes (not shown) in the supporting plates 50, 51. Thus the first drive rod 42 can freely ascend, descend, and slide. The movable core 40 and the movable flat plates 43, 44 are secured on the outer circumferential surface of the first drive rod 42 with a nut; and a second drive rod 54 is coupled to the lower part of the first drive rod 42 through a pin 53.

A supporting plate 55 is coupled to the lower part of the first drive rod 42; and a ring-shaped breaking spring 56 that draws a circle around the shaft center of the first drive rod 42 is fit between the supporting plate 55 and the base 35. The breaking spring 56 gives the first drive rod 42 elastic force for breaking the movable core 40 away from the fixed core 41 through the supporting plate 55. The permanent magnet 45 is placed around the movable core 40 and the permanent magnet 45 is secured on the supporting plate 48.

The fixed core 41 is secured on the supporting plate 50 with a bolt. The movable core 40 and the fixed core 41 may be made of pure iron or silicon steel to reduce magnetic reluctance. A slit may be formed in the movable core 40 and the fixed core 41 to shorten operating times.

The lower part of the second drive rod 54 is coupled to a pair of levers 58 through a pin 57. The levers 58 are an element of the link mechanism 15 that changes the direction of transmission of driving force by electromagnetic force produced from the electromagnetic operating device 16; and the levers 58 are coupled to levers 60 through a shaft 59. The levers 60 are coupled to an operating rod 62 through a pin 61 and the operating rod 62 is coupled to the insulating rod 27.

In the drawings, Reference numeral 63 denotes a control board and 64 denotes a capacitor. The control board 63 is mounted with: a control logic portion that receives power supply as well as a signal according to a closing command (breaking command) from a remote source and performs logical operation to control excitation of the electromagnetic operating device 16; a charging/discharging circuit for charging and discharging the capacitor 64; a relay and a relay contact for controlling the direction of energization of the coil 38; a light emitting diode for indicating the completion of charging of the capacitor 64; and the like.

A description will be given to the closing and opening operation of the vacuum circuit breaker 13 in this embodiment.

When a closing command is inputted from the driver's cab of the train to the control board 63, the coil 38 is energized according to a signal from the control board 63. A magnetic field is formed around the coil 38 by a route of the movable core 40→the fixed core 41→the supporting plates 50, 51→the cover 46→the supporting plates 48, 49→the movable core 40. Downward attractive force is exerted on the bottom-side end face of the movable core 40 and the movable core 40 is moved to the fixed core 41 side, the movable core 40 being attracted to the fixed core 41.

The direction of the magnetic field formed by the permanent magnet 45 at this time is identical with the direction of the magnetic field produced in conjunction with the excitation of the coil 38; therefore, the movable core 40 is moved to the fixed core 41 side with attractive force enhanced.

When the closing operation (attracting operation) is performed by the electromagnetic operating device 16, the first drive rod 42 is moved downward against the elastic force of the breaking spring 56. As a result, driving force due to electromagnetic force produced from the electromagnetic operating device 16 is transmitted to the levers 58. Since the driving force is transmitted to the operating rod 62 through the shaft 59 and the levers 60, the insulating rod 27 and the movable conductor 28 are moved in the horizontal direction (to the upper side of the drawings). The movable electrode 17 of the vacuum circuit breaker 13 is brought into contact with the fixed electrode 18 and the closing operation of the vacuum circuit breaker 13 is completed. FIG. 5 illustrates this state.

In the closing operation of the vacuum circuit breaker 13, the wiping spring 37 is not contracted until the movable electrode 17 and the fixed electrode 18 are brought into contact with each other. When the movable electrode 17 and the fixed electrode 18 are brought into contact with each other, the wiping spring 37 is contracted and is thereafter continuously contracted until the closing operation is completed. Meanwhile, the breaking spring 56 is constantly contracted during the closing operation of the vacuum circuit breaker 13.

When some problem arises in the railroad vehicle and an opening command (breaking command) is given from the driver's cab of the train to the control board 63, a signal arising from the opening command is inputted from the control board 63 to the coil 38. A current is passed through the coil 38 in the opposite direction to that at the closing time and a magnetic field is formed around the coil 38 in the opposite direction to that at the closing time. In this case, the magnetic flux produced from the coil 38 and the magnetic flux produced from the permanent magnet 45 cancel out each other. As a result, the attractive force at the axial end face (the lower face in the drawings) becomes weaker than the elastic force produced from the breaking spring 56 and the wiping spring 37. Therefore, the movable core 40 is broken away from the fixed core 41 and is moved upward in the drawings.

When the first drive rod 42 is moved upward in the drawings in conjunction with the movement of the movable core 40, the operating rod 62 is moved downward in the drawings in conjunction with the upward movement of the levers 58. The movable electrode 17 of the vacuum circuit breaker 13 is broken away from the fixed electrode 18 and the movable electrode 17 and the fixed electrode 18 are brought out of contact with each other. This completes the opening command (breaking command) for the vacuum circuit breaker 13. FIG. 6 illustrates this state.

When the maintained closed state of the electromagnetic operating device 16 is canceled, the contracted wiping spring 37 is expanded and the movable electrode 17 of the vacuum circuit breaker 13 and the fixed electrode 18 are brought out of contact with each other. Thus the opening operation of the vacuum circuit breaker 13 and the opening (breaking) operation of the electromagnetic operating device 16 are simultaneously performed.

According to this embodiment, the movable electrode 17 of the vacuum circuit breaker 13 and the fixed electrode 18 can be brought out of contact with each other according to an opening command from the driver's cab. Thus a high-voltage cable involving a point of problem and sound high-voltage cables can be automatically separated from each other even when the problem such as a ground fault occurs in the high-voltage cable. This makes it unnecessary for an operator to climb onto the roof of a vehicle. It makes it possible to automatically separate a high-voltage cable involving a point of problem and sound high-voltage cables from each other without necessity for any special work at all.

The disconnectors 12A, 12B in this embodiment are secured flush with the roofs of vehicles. That is, the vacuum circuit breaker 13 and the electromagnetic operating device 16 are housed in one case 19 and the case 19 is secured directly on the roof of a vehicle. This prevents increase in the size in the height direction as compared with those secured using an insulator or the like and is advantageous.

Second Embodiment

With respect to the first embodiment, a description is given to a configuration in which the disconnector 12A is secured at some midpoint in the cables 8B and 8C placed on the roofs of vehicles, flush with the roofs of the vehicles. That is, in the configuration, the disconnector 12A is secured directly on the roof of a vehicle. Instead, for example, such an equipment box as described in Patent Literature 1 through which the cables 8B, 8C are passed may be installed under the floor of a vehicle. And the disconnector 12A configured as described in relation to the first embodiment is installed at some midpoint in the cables 8B and 8C in the equipment box. Also in this case, the same effect as that of the first embodiment can be obtained.

When equipment is installed on the roofs of a railroad vehicle, it is necessary to add a twist to prevent the equipment from becoming a source of noise. For example, the electromagnetic operating device 16 can be connected in series to the high-voltage cable 8b and be installed along the length of the high-voltage cable 8c. This makes it possible to reduce the size of the case 19 in the width direction (the direction of crossties). In this case, even when the above-mentioned equipment is installed on the roofs of a railroad vehicle, the equipment is less prone to be a source of noise. Since the above configuration allows reduction in projected sectional area, this is advantageous in terms of air resistance reduction and noise reduction.

In the description of the above embodiment, a case where an opening command is issued from the driver's cab of a train is taken as an example. When an operation switch is provided in a switchboard of a vehicle mounted with a circuit breaker, an opening command may be issued by operating the operation switch.

The present invention is not limited to the above embodiments and includes various modifications. The above embodiments are described in detail to make the present invention easy to understand and the present invention is not always limited to embodiments provided with all the described configuration elements. A part of the configuration of an embodiment may be replaced with the configuration of another embodiment; and the configuration of some embodiment may be added to the configuration of another embodiment. With respect of a part of the configuration of each embodiment, the part may be deleted from or may be replaced with another configuration element. Or, another configuration element may be added to the part.

REFERENCE SIGNS LIST

1 . . . railroad vehicle
2 . . . first vehicle unit
3 . . . second vehicle unit
4 . . . third vehicle unit
5 . . . fourth vehicle unit
6 . . . fifth vehicle unit
7 . . . sixth vehicle unit
8A, 8B, 8C, 8D . . . high-voltage cable
9A, 9B . . . pantograph
10 . . . high-voltage joint
11 . . . trifurcated high-voltage cable head
12A, 12B . . . disconnector
13 . . . vacuum circuit breaker
14 . . . rubber bellows
15 . . . link mechanism
16 . . . electromagnetic operating device
17 . . . movable electrode
18 . . . fixed electrode
19 . . . case
20 . . . roof of car
21 . . . support plate
22 . . . first U-shaped hardware
23 . . . protection cover
24 . . . second U-shaped hardware
25 . . . vacuum valve
26 . . . fixed conductor
27 . . . insulating rod
28 . . . movable conductor
29 . . . connecting conductor
30 . . . spring contact
31 . . . current collector
32 . . . first cylindrical enclosure 33 . . . second cylindrical enclosure
34 . . . epoxy resin
35 . . . base
36 . . . support plate
37 . . . wiping spring
38 . . . coil
39 . . . coil bobbin
40 . . . movable core
41 . . . fixed core
42 . . . first drive rod
43, 44 . . . movable flat plate
45 . . . permanent magnet
46, 47 . . . cover
48, 49, 50, 51, 55 . . . supporting plate
52 . . . fixed rod
53, 57, 61 . . . pin
54 . . . second drive rod
56 . . . breaking spring
58, 60 . . . levers
59 . . . shaft
62 . . . operating rod
63 . . . control board
64 . . . capacitor

The invention claimed is:

1. A railroad vehicle formed by dispersedly mounting a plurality of vehicles with main power devices that are supplied with power from a power supply line through a pantograph and constitute power supply units,
the railroad vehicle comprising:
a plurality of vehicle units in which respective vehicles are coupled;
a cable placed astride the vehicles to connect the power supply unit of each vehicle unit; and
a disconnector that is installed at some midpoint in the cable and electrically separates the vehicle units from one another, wherein
the disconnector is a vacuum circuit breaker electromagnetically operated or operated by air,
the vacuum circuit breaker and the electromagnetic operating device or air operating device are housed in one case and the case is secured directly on the roof of the vehicle, and
the case is supported by a support plate and is secured on the roof of the vehicle by securing the support plate on a first U-shaped hardware directly embedded into the roof of the vehicle with a bolt.

2. The railroad vehicle according to claim 1,
wherein the disconnector is installed at some midpoint in the cable placed on the roofs of the vehicles, and is flush with the roofs of the vehicles.

3. The railroad vehicle according to claim 1,
wherein the disconnector is so installed that the disconnector is opened and closed in a horizontal direction.

4. The railroad vehicle according to claim 2,
wherein the disconnector is so installed that the disconnector is opened and closed in a horizontal direction.

5. The railroad vehicle according to claim 2,
wherein the disconnector is a vacuum circuit breaker electromagnetically operated or operated by air.

6. The railroad vehicle according to claim 3,
wherein the disconnector is a vacuum circuit breaker electromagnetically operated or operated by air.

7. The railroad vehicle according to claim 4,
wherein the disconnector is a vacuum circuit breaker electromagnetically operated or operated by air.

8. The railroad vehicle according to claim 5,
wherein the vacuum circuit breaker and the electromagnetic operating device or air operating device are housed in one case and the case is secured directly on the roof of the vehicle.

9. The railroad vehicle according to claim 6,
wherein the vacuum circuit breaker and the electromagnetic operating device or air operating device are housed in one case and the case is secured directly on the roof of the vehicle.

10. The railroad vehicle according to claim 7,
wherein the vacuum circuit breaker and the electromagnetic operating device or air operating device are housed in one case and the case is secured directly on the roof of the vehicle.

11. The railroad vehicle according to claim 8,
wherein the case is supported by a support plate and is secured on the roof of the vehicle by securing the support plate on a first U-shaped hardware directly embedded into the roof of the vehicle with a bolt.

12. The railroad vehicle according to claim 9,
wherein the case is supported by a support plate and is secured on the roof of the vehicle by securing the support plate on a first U-shaped hardware directly embedded into the roof of the vehicle with a bolt.

13. The railroad vehicle according to claim 8,
wherein the case is surrounded with a protection cover except the bottom face of the case and the protection cover is secured on a second U-shaped hardware directly embedded into the roof of the vehicle with a bolt.

14. The railroad vehicle according to claim 1,
wherein an equipment box through which the cable is passed is installed under a floor of the vehicle and the disconnector is installed at some midpoint in the cable in the equipment box.

15. The railroad vehicle according to claim 11,
wherein an equipment box through which the cable is passed is installed under a floor of the vehicle and the disconnector is installed at some midpoint in the cable in the equipment box.

16. A railroad vehicle formed by dispersedly mounting a plurality of vehicles with main power devices that are supplied with power from a power supply line through a pantograph and constitute power supply units,
the railroad vehicle comprising:
a plurality of vehicle units in which respective vehicles are coupled;
a cable placed astride the vehicles to connect the power supply unit of each vehicle unit; and
a disconnector that is installed at some midpoint in the cable and electrically separates the vehicle units from one another, wherein
the disconnector is installed at some midpoint in the cable placed on the roofs of the vehicles, and is flush with the roofs of the vehicles,
the disconnector is a vacuum circuit breaker electromagnetically operated or operated by air,
the vacuum circuit breaker and the electromagnetic operating device or air operating device are housed in one case and the case is secured directly on the roof of the vehicle, and
the case is supported by a support plate and is secured on the roof of the vehicle by securing the support plate on a first U-shaped hardware directly embedded into the roof of the vehicle with a bolt.

17. A railroad vehicle formed by dispersedly mounting a plurality of vehicles with main power devices that are supplied with power from a power supply line through a pantograph and constitute power supply units, the railroad vehicle comprising:
a plurality of vehicle units in which respective vehicles are coupled;
a cable placed astride the vehicles to connect the power supply unit of each vehicle unit; and
a disconnector that is installed at some midpoint in the cable and electrically separates the vehicle units from one another, wherein
the disconnector is a vacuum circuit breaker electromagnetically operated or operated by air,
the vacuum circuit breaker and the electromagnetic operating device or air operating device are housed in one case and the case is secured directly on the roof of the vehicle, and
the case is surrounded with a protection cover except the bottom face of the case and the protection cover is secured on a second U-shaped hardware directly embedded into the roof of the vehicle with a bolt.

\* \* \* \* \*